United States Patent [19]
Katagiri

[11] Patent Number: 5,760,707
[45] Date of Patent: Jun. 2, 1998

[54] METHOD OF TRANSMITTING MULTIPLE SERIAL SIGNALS

[75] Inventor: Takashi Katagiri, Nagano, Japan

[73] Assignee: Kabushiki Kaisha Sankyo Seiki Seisakusho, Nagano, Japan

[21] Appl. No.: 606,680

[22] Filed: Feb. 26, 1996

Related U.S. Application Data

[63] Continuation of Ser. No. 263,681, Jun. 22, 1994.

[30] Foreign Application Priority Data

Jun. 23, 1993 [JP] Japan ................... 5-176021

[51] Int. Cl.$^6$ ................................................ G08C 19/04
[52] U.S. Cl. .................. 340/870.11; 340/870.14; 370/112; 341/100; 341/101
[58] Field of Search ............ 340/870.1, 870.11, 340/870.12, 870.14, 870.18, 870.21, 870.05; 370/112; 395/891; 341/100, 101; 364/239.2, 939.5

[56] References Cited

U.S. PATENT DOCUMENTS

| | | | |
|---|---|---|---|
| 4,181,850 | 1/1980 | Fairbairn | 250/455 T |
| 4,611,206 | 9/1986 | Taniguti | 340/870.11 |
| 4,727,541 | 2/1988 | Mori et al. | 370/112 |
| 5,062,105 | 10/1991 | McKnight et al. | 370/112 |
| 5,068,529 | 11/1991 | Ohno et al. | 250/231.18 |
| 5,136,587 | 8/1992 | Obana et al. | 370/112 |
| 5,150,863 | 9/1992 | Mitchell | 370/112 |
| 5,210,745 | 5/1993 | Guinand et al. | 370/112 |
| 5,214,650 | 5/1993 | Renner et al. | 370/112 |
| 5,243,599 | 9/1993 | Barrett et al. | 370/112 |
| 5,325,398 | 6/1994 | Murakami et al. | 375/21 |
| 5,357,091 | 10/1994 | Ozawa et al. | 235/380 |

*Primary Examiner*—Jeffery Hofsass
*Assistant Examiner*—Ashok Mannara
*Attorney, Agent, or Firm*—Sughrue, Mion, Zinn, Macpeak & Seas

[57] ABSTRACT

In a method of transmitting multiple serial signals, parallel signals are converted into serial signals by a plural number of parallel-to-serial converters contained in a transmitter, serial signals are converted into parallel signals by a plural number of serial-to-parallel converters contained in a receiver, and multiple serial signals are transmitted between the transmitter and the receiver through a channel. In the method, for data transmission, said plural number of parallel-to-serial converters and said plural number of serial-to-parallel converters are connected in series, and the format of the serial signals on the channel, the format for the parallel-to-serial converters located preceding to the channel, and the format for the serial-to-parallel converters located succeeding to the channel are the same formats. In this case, these formats may be of the start-stop synchronization type.

15 Claims, 12 Drawing Sheets

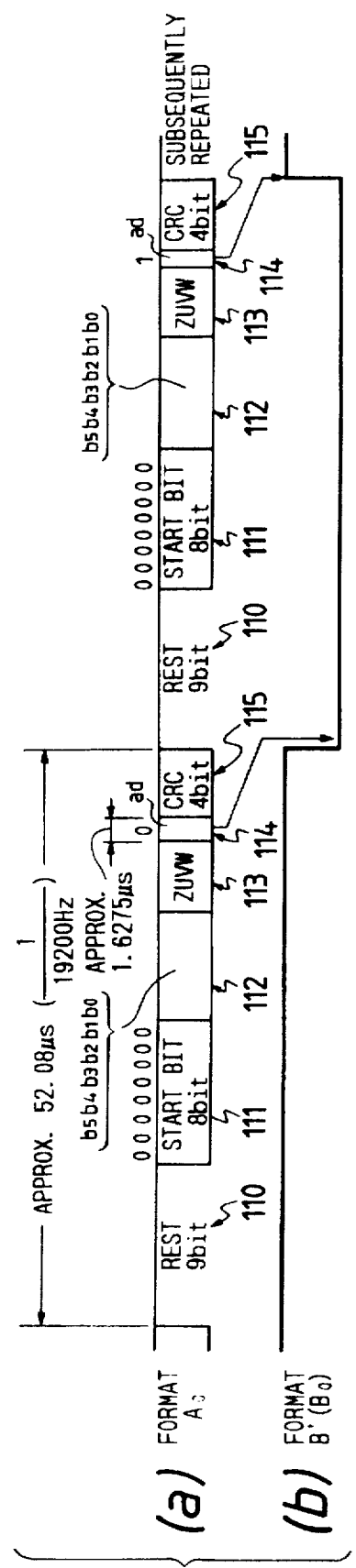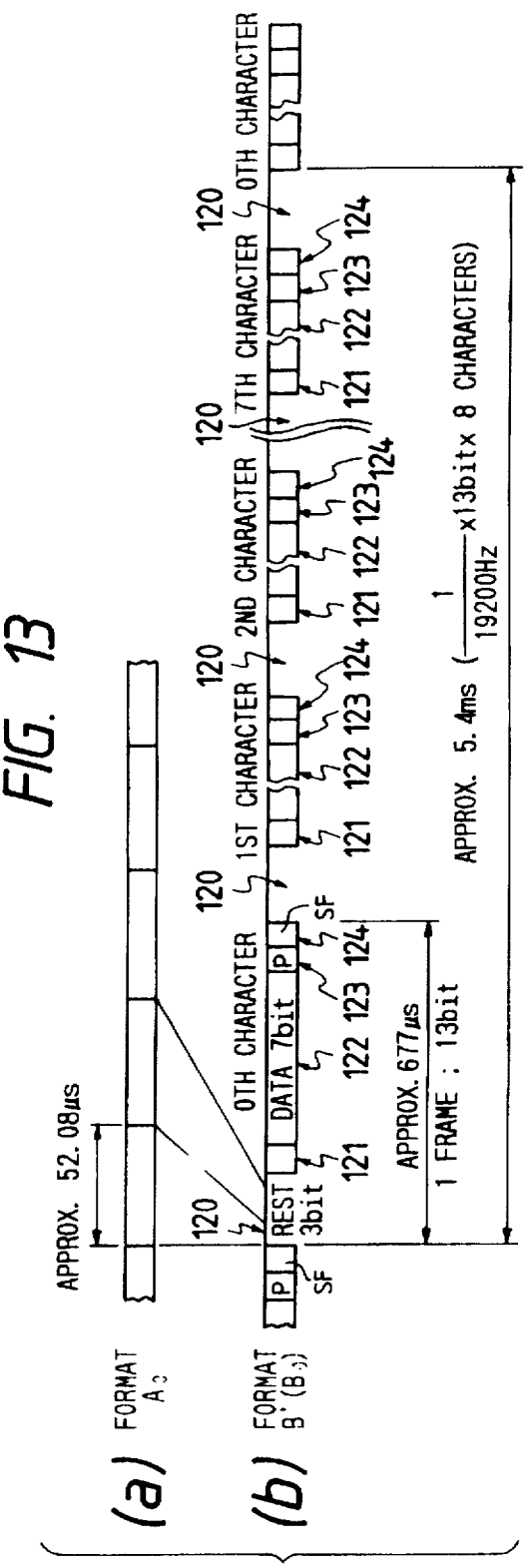

METHOD OF TRANSMITTING MULTIPLE SERIAL SIGNALS

This is a continuation of application Ser. No. 08/263,681 filed Jun. 22, 1994.

BACKGROUND OF THE INVENTION

The present invention relates to a method of transmitting multiple serial signals.

By convention, in a motor, for example, a brushless motor, position data of the main shaft of the motor is detected. To detect the position data, a magnetic recording medium for detecting A, B, and Z phases and a magnetic pole detecting magnet for detecting U, V, and W phases are attached to the end portion of the main shaft of the motor. The magnetic recording medium produces pulse signals representative of position data, and the magnetic pole detecting magnet produces drive position data signals. In the specification, the A and B phases each mean the output signal of a pulse generator which generates an n number of 90° phase pulse signals, of which the phase advance and delay vary with the turning direction, for each turn of the main shaft. The Z phase means the output signal of an origin pulse generator which generates one pulse signal every turn of the main shaft of the motor.

The U, V, and W phases each mean the output signal of a magnetic pole detect signal generator which generates a pulse signal according to a magnetic pole position of the field magnet of the motor.

These items of data are transmitted through a cable containing a bundle of channels to a control unit which carries out various types of controls, such as a feedback control according to the data.

The data transmission system suffers from the following problems.

When a called absolute encoder for detecting an absolute position of the main shaft of the motor is used for the phase detector, signals of four channels, i.e., A phase, B phase, serial phase (Z, U, V, and W phases), and an absolute count value, must be transmitted. Thus, a number of transmission lines are used. A cable which bundles these transmission lines is fat. This brings about increase of cost. Where the control unit is installed at a relatively remote location, the transmission lines are long, so that these problems become more serious.

When a part of the cable is wired inside the machine, the fat cable occupies a large space within the machine. Outside the machine, the fat cable makes it difficult to arrange the cable per se. In either case, support members of relatively high rigidity must be used for supporting the fat cable. In this respect, a design freedom is limited.

In order to overcome the above-discussed problems, the signal transmitting device are proposed as disclosed in U.S. patent application Ser. No. 08/174,044 filed on Dec. 28, 1993.

The technique disclosed in the above-mentioned Patent Application has the following problems.

The transmission format for data transmission between a subconverter and a main converter is different from that for data transmission between a transmitter and a receiver. Therefore, for the subconverter and its peripheral circuit and the main converter and its peripheral circuit, two types of circuits must be designed and mounted on a PCB (printed circuit board). As a result, the cost of design, parts, management, and the like is increased. Particularly when the number of the subconverters is increased, the cost of design, parts, management, and the like is correspondingly increased.

SUMMARY OF THE INVENTION

Accordingly, an object of the present invention is to provide a method of transmitting multiple serial signals which can realize cost reduction.

In a method of transmitting multiple serial signals, parallel signals are converted into serial signals by a plural number of parallel-to-serial converters provided in a transmitter; serial signals are converted into parallel signals by a plural number of serial-to-parallel converters provided in a receiver; and multiple serial signals are transmitted between the transmitter and the receiver through a transmission channel, in which the plural number of parallel-to-serial converters and the plural number of serial-to-parallel converters are connected in series, and the format of the serial signals on the channel, the format for the parallel-to-serial converters located preceding to the channel, and the format for the serial-to-parallel converters located succeeding to the channel are the same formats.

Fruthermore, the parallel-to-serial converters and the serial-to-parallel converters are constructed with ICs each with a transfer-rate select function, and these ICs are connected for data transmission.

Moreover, the common format for the parallel-to-serial converters and the serial-to-parallel converters is the formats of the start-stop synchronization type.

According to the invention, for data transmission, the plural number of parallel-to-serial converters and the plural number of serial-to-parallel converters are connected in series, and the format of the serial signals on the channel, the format for the parallel-to-serial converters located preceding to the channel, and the format for the serial-to-parallel converters located succeeding to the channel are the same formats. Therefore, the first invention succeeds in cost reduction in design, parts, management and the like.

Furthermore, the parallel-to-serial converters and serial-to-parallel converters are constructed with ICs each with a transfer-rate select function. Therefore, the converters may be mounted separately. For example, for a user who does not use the subconverters, the signal transmission system supplied to him is designed omitting the subconverters. This brings about cost reduction.

Moreover, for data transmission, the plural number of parallel-to-serial converters and the plural number of serial-to-parallel converters are connected in series, the format of the serial signals on the channel, the format for the parallel-to-serial converters located preceding to the channel, and the format for the serial-to-parallel converters located succeeding to the channel are the same formats of the start-stop synchronization type. With this construction, commercially available ICs may be used for the subconverters. This also leads to cost reduction in design, parts, management and the like.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings.

FIG. 12 is a diagram showing the relationship between formats Ao and Bo' (Bo) in a signal transmission system incorporating a method of transmitting multiple serial signals according to a third embodiment of the present invention; and FIG. 13 is a diagram showing the data formats of FIG. 12 of which the time axis is reduced.

DETAILED DESCRIPTION OF THE PREFERRED EMBODIMENTS

The preferred embodiments of the present invention will be described with reference to the accompanying drawings.

Figure 1:
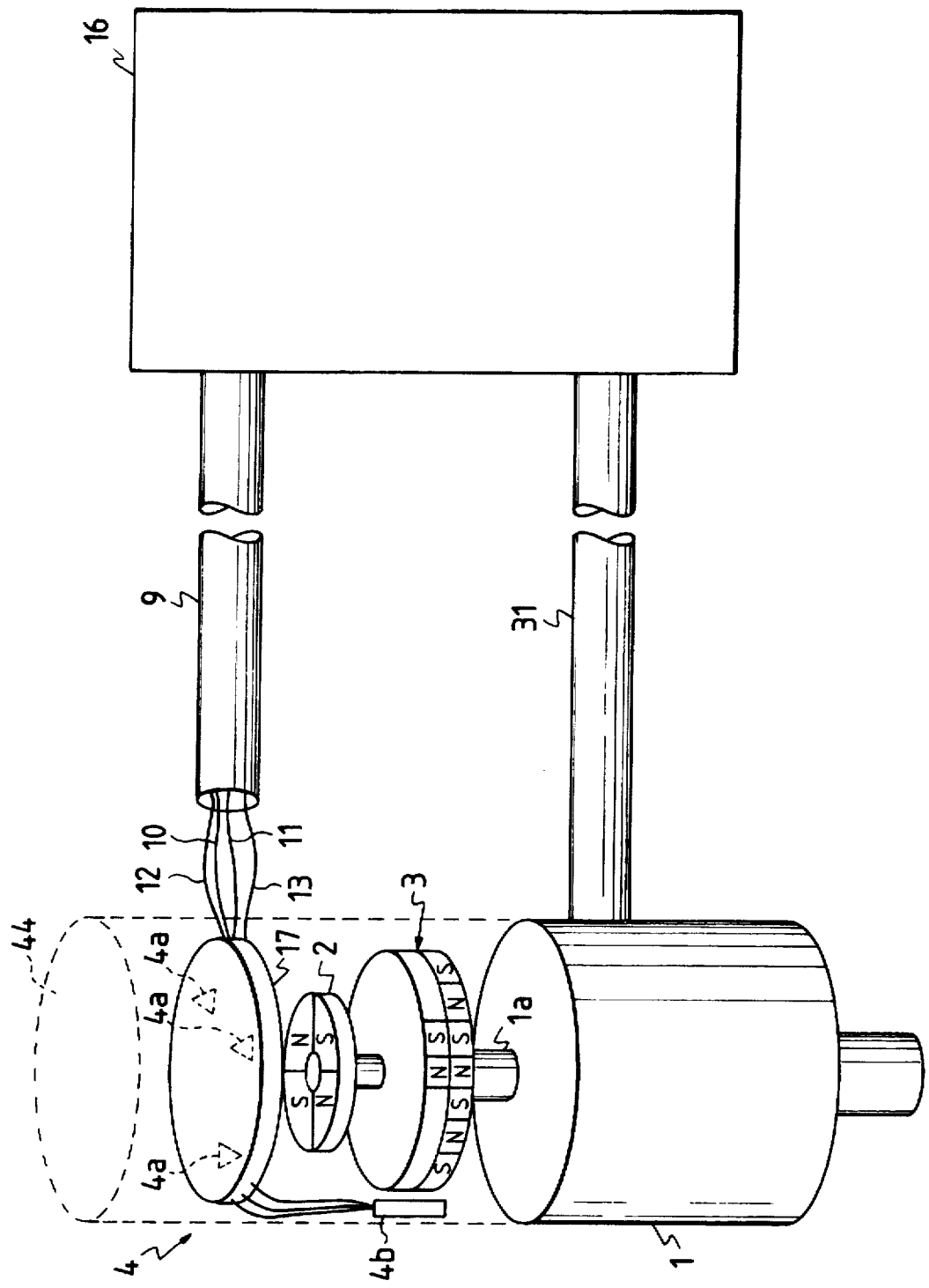
FIG. 1 is a perspective view showing a signal transmission system incorporating a method of transmitting multiple serial signals according to an embodiment of the present invention.
Figure 2:
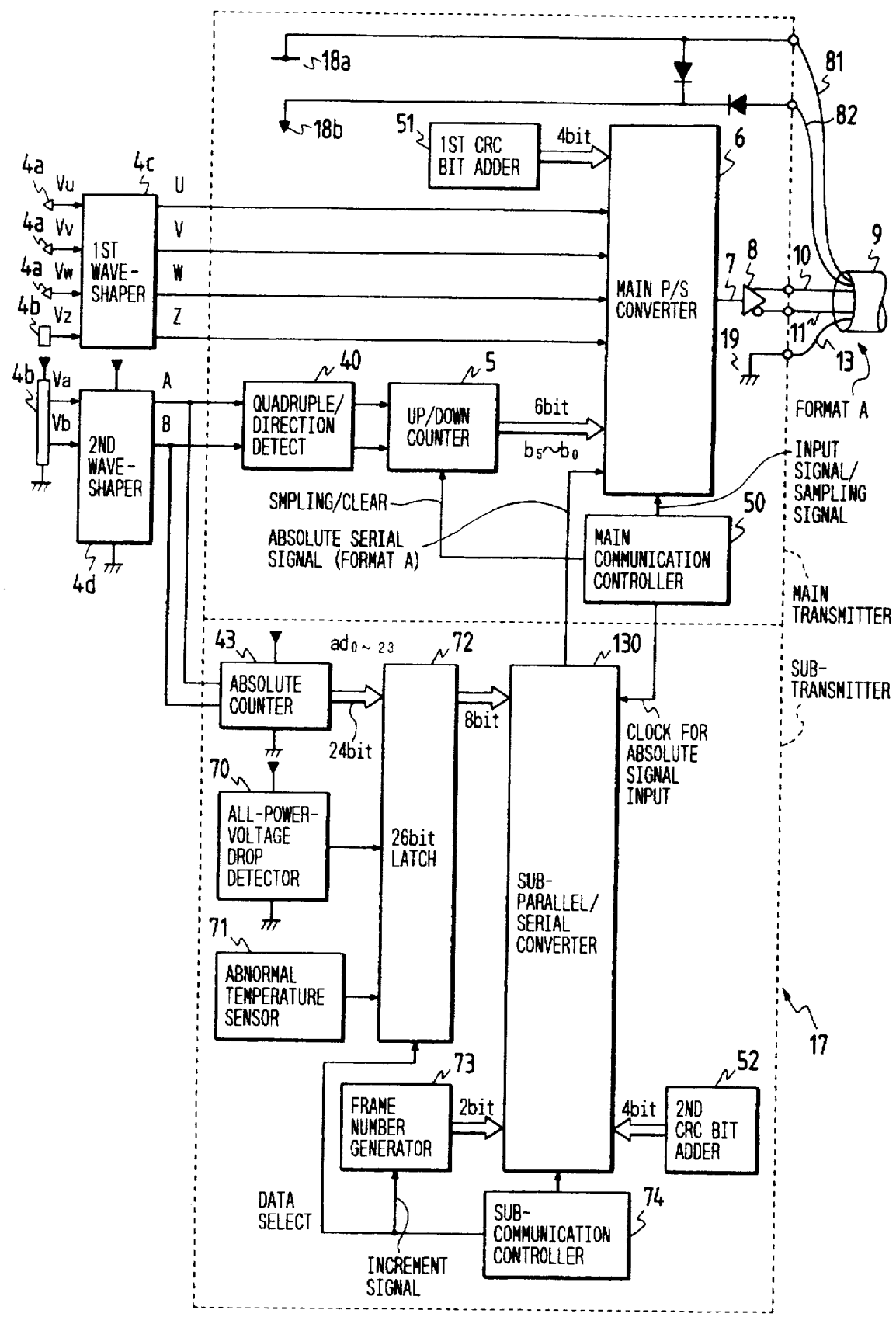
FIG. 2 is a block diagram showing an absolute encoder used in the signal transmission system shown in FIG. 1.
Figure 3:
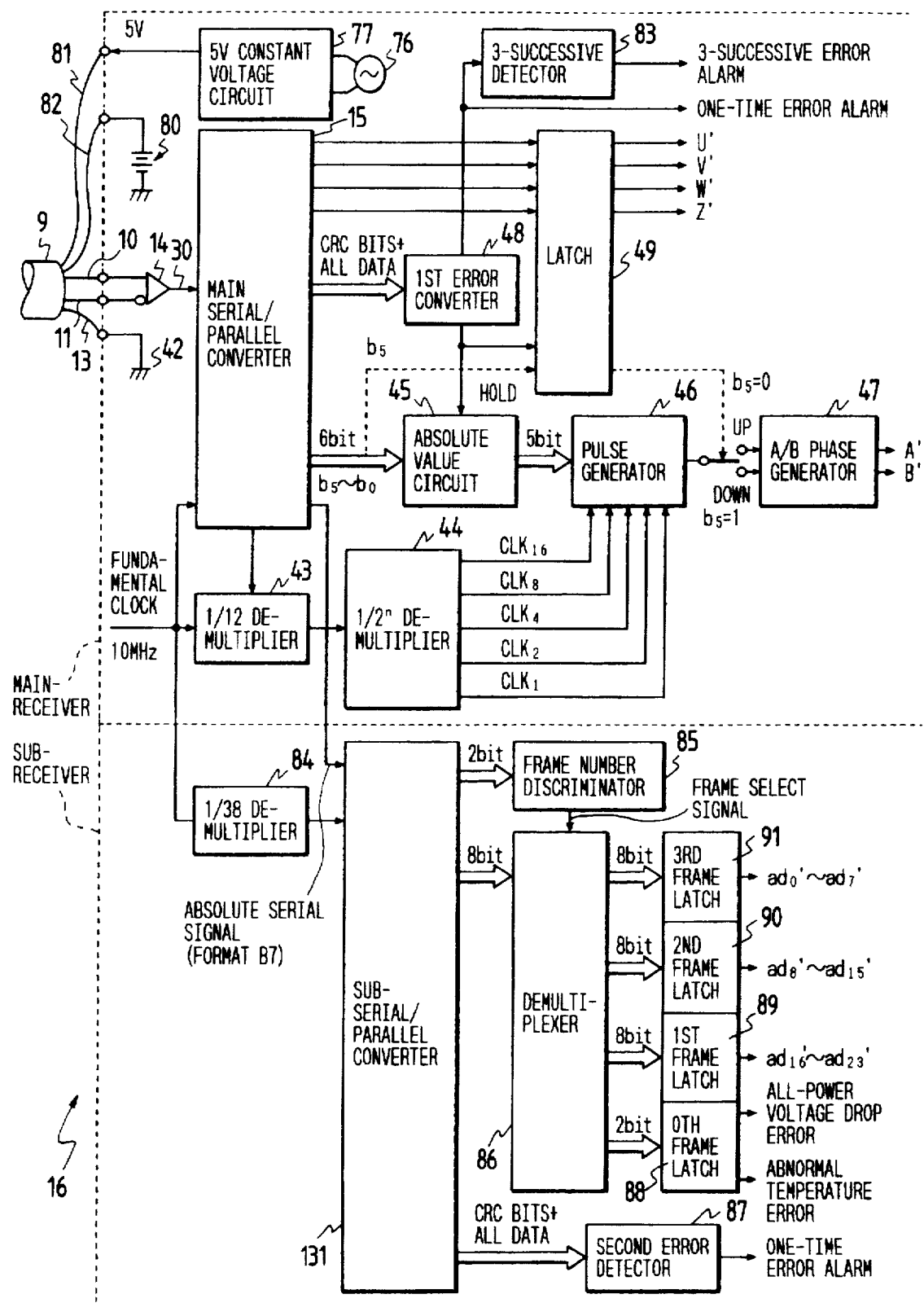
FIG. 3 is a block diagram showing a control unit of the signal transmission system shown in FIG. 1.

FIG. 1 is a perspective view showing a signal transmission system incorporating a method of transmitting multiple serial signals according to an embodiment of the present invention. FIG. 2 is a block diagram showing an absoltue encoder used in the signal transmission system shown in FIG. 1. FIG. 3 is a block diagram showing a control unit of the signal transmission system shown in FIG. 1. The signal transmission system is applied to the arm of a robot, for example.

In FIG. 1, reference numeral 1 designates a brushless motor. A magnetic pole detect magnet 2, shaped like a disc, is mounted on the end face of a main shaft 1a of the brushless motor 1. The magnetic pole detect magnet 2 is magnetized such that N pole and S pole are alternately arrayed in the circumferential direction. The magnetic pole detect magnet 2 produces position data for driving U, V, and W phases. A disc-like magnetic recording medium 3 is located under the magnetic pole detect magnet 2. The magnetic recording medium 3 for sending out position data for the Z, A, and B phases consists of two stages, the upper stage including two magnetic poles N and S arrayed in the circumferential direction, and the lower stage N and S poles alternately arrayed in the circumferential direction.

The brushless motor 1 is provided with an absolute encoder 4 for detecting position data of the A, B, Z, U, and V phases, and absolute position data of the motor. Hall elements 4a and an MR sensor 4b are respectively disposed in opposition to the magnetized surfaces of the magnetic pole detect magnet 2 and the magnetic recording medium 3 within a case 44 (indicated by a dotted line for simplicity illustration) of the absolute encoder 4. The Hall elements 4a are mounted on the reverse side of of the base board of a signal processor 17. The signal processor 17 includes first and second wave-shaping circuits 4c and 4d, a quadruple/ direction detect circuit 40, an up/down counter 5, a main parallel-to-serial converter 6, a main communication controller 50, a first CRC bit adder 51, an absolute counter 43, an all-power-voltage drop detector 70, an abnormal temperature sensor 71, a 26-bit latch 72, a sub-parallel-to-serial converter 130, a sub-communication controller 74, a second CRC bit adder 52, a frame number generator 73, a line driver 8, a 5V-power source terminal 18a, a backup power source terminal 18b, and a ground power source 19.

The output lines of the Hall elements 4a and the MR sensor 4b, as shown in FIG. 2, are connected to the first and second wave-shaping circuits 4c and 4d. The A and B phase output lines of the second wave-shaping circuit 4d are connected to the quadruple/direction detect circuit 40 for converting the received signals to a quadruple pulse signal and an up/down signal. The output lines of the quadruple/ direction detect circuit 40 and the output line of the main communication controller 50 are connected to the 6-bit up/down counter 5 for counting up or down the received signal in accordance with an advance or a delay of the phase of the A and B phases. The output line of the up/down counter 5 is connected to the main parallel-to-serial converter 6. The output lines for other phases (Z, U, V, and W) are connected to the main parallel-to-serial converter 6, through the first wave-shaping circuit 4c.

The output lines of the second wave-shaping circuit 4d are also connected to the absolute counter 43. The 26-bit latch 72 is connected to the output lines of the absolute counter 43, the all-power-voltage drop detector 70 for producing an alarm signal when the power voltages of the power sources including a backup power source drop, and the abnormal temperature sensor 71 for producing a signal indicative of an abnormal motor temperature, and the signal line of the subcommunication controller 74 for selecting the data. An increment signal line of the sub-communication controller 74 is connected to the frame number generator 73 for generating a 2-bit frame number signal. The sub-parallel-to-serial converter 130 is connected to the output lines of the frame number generator 73, the 26-bit latch 72, sub-communication controller 74, and the second CRC bit adder 52 for detecting an error, and an absolute serial signal input clock line of the main communication controller 50. The output line of the sub-parallel-to-serial converter 130 is connected to the main parallel-to-serial converter 6, which is connected to the output line of the first CRC bit adder 51.

The serial signal line 7 of the main parallel-to-serial converter 6 is connected to the line driver 8.

The bus 10 and the inverted bus 11 derived from the line driver 8 are coupled with the line receiver 14 in the control unit 16, as shown in FIG. 3. The ground power sources 19 and 42 are provided in the signal processor 17 and the ground power source 19. These ground power sources 19 and 42 are connected to each other by a ground line 13. The control unit 16 contains a 5V constant voltage circuit 77 and a backup power source 80. The 5V constant voltage circuit 77, connected to a commercial power source 76, forms a DC power source of about 5V. The backup power source 80 operates to back up the system at the time of power failure. A 5V power line 81 derived from the 5V constant voltage circuit 77 is connected to a 5V-power source terminal 18a in the signal processor 17. A backup power line 82 derived from the backup power source 80 is connected to a backup power source terminal 18b in the signal processor. The 5V power line 81, the backup power line 82, and the ground power source line 13, together with the bus 10 and the inverted bus 11, are put together and contained in the encoder cable 9. The encoder cable 9 is properly supported by support means, not shown.

All of the circuits in the signal processor 17 are connected to the 5V-power source terminal 18a (power source not backed up). Incidentally, these circuits are connected to a backup power source system through diodes. The backup power source terminal 18b (power source backed up) is connected to the MR sensor 4b, the second wave-shaping circuit 4d, the absolute counter 43, the all-power-voltage drop detector 70, and the like. In FIG. 2, a black triangle mark indicates that the backup power source terminal 18b is connected to all of the circuits.

The power lines connecting the 5V-power source terminal 18a and the backup power source terminal 18b to the related circuits are omitted for simplicity of illustration.

The output line of the line receiver 14 in the control unit 16 is connected to through the serial signal line 30 to a main serial-to-parallel converter 15. The main serial-to-parallel converter 15 outputs in parallel the position data of the Z, U, and V phases, the counter values of the A and B phases, error detect CRC bits, and an absolute serial signal. The output line for the counter values derived from the main serial-to-parallel converter 15 is connected to an absolute value circuit 45 which determines whether the received signal is positive or negative, and if the received signal is negative, converts it to a positive signal. The output lines for the position data of the Z, U, and V phases, the counter values, error detect CRC bits, and an absolute serial signal are connected to a first error counter 48, which is for detecting an error. The output line of the first error counter 48 for giving a hold instruction is connected to the absolute value circuit 45 and the latch circuit 49.

The first error counter 48 outputs a one-time alarm signal to exterior, and also to a 3-successive detect circuit 83. The 3-successive detect circuit 83 outputs a 3-successive error alarm signal to exterior. When the transmission performance is good, the one-time alarm signal is connected to a circuit for stopping the power supply to the motor. When the channel is bad in quality, a 3-successive alarm signal is produced or connected to the motor power supply stop circuit.

The output line of the main serial-to-parallel converter 15, which is for a reset signal corresponding to a one-frame serial signal, is connected to the 1/12 demultiplier 43A which receives a fundamental clock signal at 10 MHz and produces a ($2^n-1$) number of pulses. The output line of the 1/12 demultiplier 43A is connected to a $\frac{1}{2^n}$ demultiplier 44A for generating five patterns of pulse trains, which have different pulse densities. The output lines of the $\frac{1}{2^n}$ demultiplier 44A and the output line of the absolute value circuit 45 are connected to a pulse generator 46 for selecting pulses in accordance with an absolute value. The output line of the pulse generator 46 is connected to an A/B phase generator 47. The A/B phase generator 47 selects an up mode or a down mode in accordance with a counter value $b_5$ (to be given later) and reproduces a rectangular wave signal of the A phase or B phase. The absolute serial signal line derived from the main serial-to-parallel converter 15 is connected to a sub-serial-to-parallel converter 131. The sub-serial-to-parallel converter 131 is connected to the output line of a 1/38 demultiplier 84 for demultiplying 10 MHz of the fundamental clock signal to a 1/38 frequency.

The output lines for an absolute counter value, a frame number, an all-power-voltage drop error data, abnormal temperature error data, and CRC bits, which are output from a sub-serial-to-parallel converter 131, are connected to a second error detector 87 for error detection. The output signal of the second error detector 87 is output to exterior in the form of a one-time error alarm. When the transmission performance is good, the one-time error alarm signal is output to a motorpower-supply stop circuit, not shown.

The output line for a frame number signal of 2 bits output from the sub-serial-to-parallel converter 131 is connected to a frame number discriminator 85. The 8-bit output line for all data including absolute counter data is connected to a demultiplexer 86. A frame select signal line derived from the frame number discriminator 85 is connected to the demultiplexer 86. 8-bit frame latches 88 to 91 are connected to the demultiplexer 86. The 0th frame latch 88 produces information as to whether or not all-power-voltage drop and information as to whether or not motor temperature rise is normal. The 1st frame latch 89 produces the 8-high-order bits ($ad_{23}$, to $ad_{16}$.) of the absolute counter. The 2nd frame latch 90 produces the 8-mid-order bits ($ad_{15}$, to $ad_8$.) of the absolute counter. The 3rd frame latch 91 produces the 8-low-order bits ($ad_7$, to $ad_0$.) of the absolute counter.

The main parallel-to-serial converter 6 and the sub-parallel-to-serial converter 130 are fabricated into a single circuit. The same thing is true for the first CRC bit adder 51 and the second CRC bit adder 52, the main communication controller 50 and the sub-communication controller 74 in the transmitter, and the main serial-to-parallel converter 15 and the sub-serial-to-parallel converter 131, and the first error counter 48 and the second error detector 87 in the receiver. The reason for this will be described later.

The control unit 16 and the brushless motor 1, as shown in FIG. 1, are connected to each other by the motor cable 31 so that the control unit 16 drives the brushless motor 1.

The operation of the thus constructed signal transmission system will be described.

Figure 4:
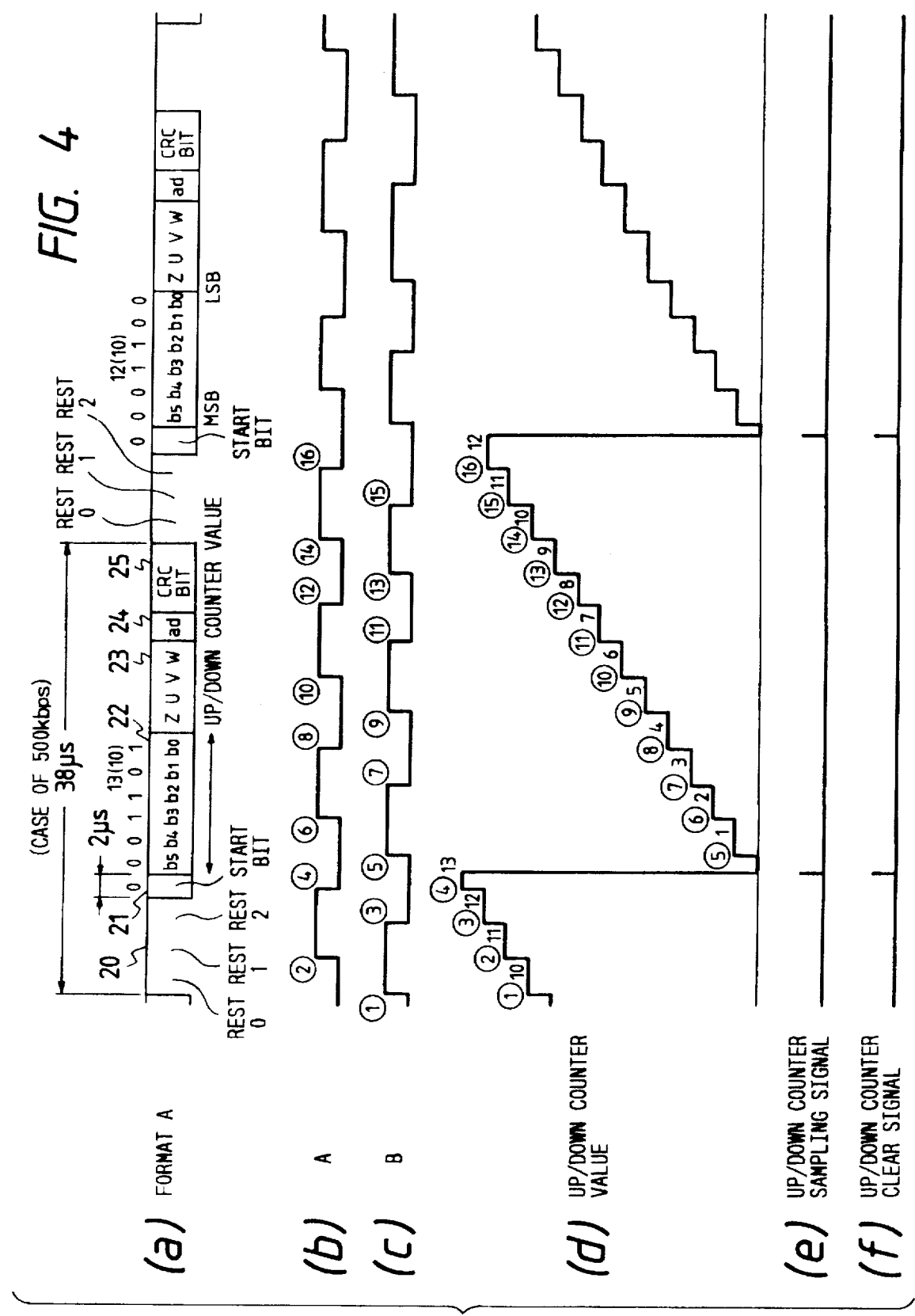
FIG. 4 is a timing chart useful in explaining the operation of the encoder of FIG. 2.

To drive the motor 1, a drive power is supplied from the control unit 16 to the motor 1, through the motor cable 31. Then, the main shaft 1a of the motor starts to turn, so that a magnetic field starts to vary under the influence of the magnetic pole detect magnet 2 and the magnetic recording medium 3. The variation of the magnetic field is detected by the Hall elements 4a in the form of drive position data of the U, V and W phases. The MR sensor 4b detects the magnetic field variation in the form of position data of the Z, A, and B phases, and produces the A and B phases in the form of a sinusoidal wave. The data signals Vu, Vv, Vw, Vz, Va, and Vb (see FIG. 2) are input to the first and second wave-shaping circuits 4c and 4d where those are wave shaped into rectangular wave signals. The rectangular wave signals as the wave-shaped A and B phases are illustrated in FIGS. 4(b) and 4(c). These wave-shaped signals A and B (incremental signals) are converted into pulse signals of which the frequency is quadrupled and an up/down signal in the quadruple/direction detect circuit 40. The quadruple pulse signal and the up/down signal are input to the 6-bit up/down counter 5 where those signals are counted up or down.

Figure 6:
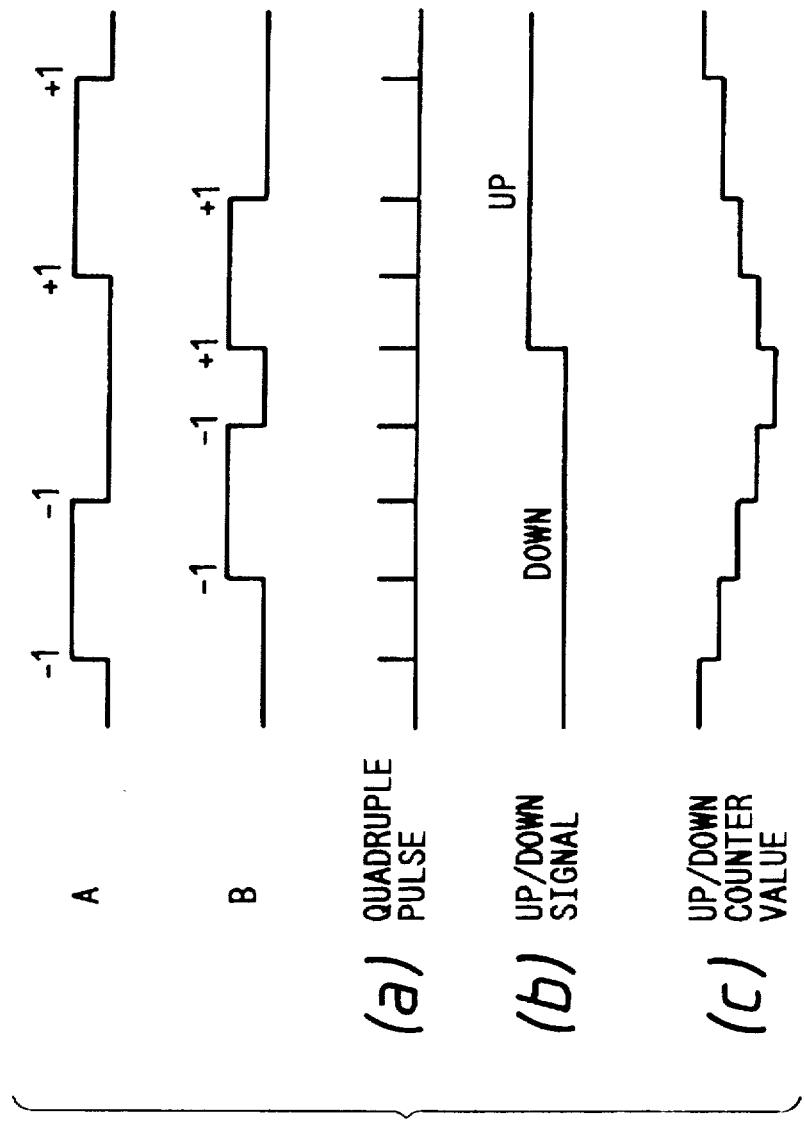
FIG. 6 is a timing chart exemplarily showing the operation of a quadruple/direction detect circuit and an up/down counter in the absolute encoder of FIG. 2.

The operation of the quadruple/direction detect circuit 40 and the up/down counter 5 is exemplarily shown in FIG. 6.

As shown, a quadruple pulse (a) is generated at the edges (zero-crossing points of the signals) of the signals A and B. An up/down signal (b) instructs an up or down mode of the up/down counter 5 in accordance with an advance or delay of the phase of the signals A and B. When the B phase advances, the up/down signal (b) instructs a down mode. When the A phase advances, it instructs a down mode. A counter value (c) of the up/down counter 5 is stepwise varied in accordance with the quadruple pulse (a) and the up/down signal (b).

In the present embodiment, the up/down counter 5 samples a counter value at fixed time intervals in response to a sampling signal (FIG. 4(e)) from the main communication controller 50. When the sampled counter value is loaded into the main parallel-to-serial converter 6, the up/down counter 5 clears its contents in response to a clear signal (FIG. 4(f)) from the main communication controller 50. The present embodiment is designed such that the signal B usually advances in phase with respect to the signal A. Accordingly, a counter value of the up/down counter 5 varies as shown in FIG. 4(d).

These counter values are input as 6 bits signals $b_0$ to $b_5$ to the main parallel-to-serial converter 6. The position data signals U, V, W, and Z wave shaped are directly input to the main parallel-to-serial converter 6.

In the signal transmission system of the present embodiment, the counter value $b_5$ is MSB, and the counter value $b_0$ is LSB. When the B phase advances, $b_5=0$. When the A phase advances, $b_5=1$.

Encircled numerals in FIGS. 4(b) and 4(c) correspond to those in FIG. 4(d), respectively. That is, the change points of the A and B phases in FIGS. 4(b) and 4(c) correspond to changes of the counter values of the counter, respectively.

Numerals not encircled in FIG. 4(d) indicate counter values.

The reason why the 6-bit up/down counter 5 is used will be described hereinafter.

Assuming that a transfer rate of the serial signal output from the main parallel-to-serial converter 6 is 500 kbps, and the format of the serial signal is as shown in FIG. 4(a), 38 µs is taken for sampling one frame. Assuming that 2048 pulses of the A and B phases are produced every turn of the main shaft 1a, and the main shaft 1a turns at a maximum speed of 5000 rpm, the frequency of the quadruple pulse signal is 5000 rpm÷60 seconds×2048 pulses×4=682.7 kHz.

The sampling period is 38 µs as already referred to. Accordingly, during this period the following number of pulses are input to the counter 682.7 kHz×38 µs=25.9 pulses/period.

Here, $25.9<31=2^5-1$, and then 6 bits suffice for the counter value of the up/down counter 5.

The signal from the second wave-shaping circuit 4d is also input to the absolute counter 43. The absolute counter 43 outputs its counter value in the form of signals $ad_0$ to $ad_{23}$ of 24 bits. The 24-bit signals ado to $ad_{23}$, and 1-bit error signals output from the all-power-voltage drop detector 70 and the abnormal temperature sensor 71 are input to the 26-bit latch 72. In accordance with a data select signal from the sub-communication controller 74, data of 26 bits is latched therein, and data is transferred every 8 bits to the sub-parallel-to-serial converter.

When the 5V power voltage and the back power voltage drop to below a preset voltage, the all-power-voltage drop detector 70 produces 0 as an abnormal signal. When temperature of the motor winding or temperature within the encoder reach a preset value, the abnormal temperature sensor 71 produces 0 as an abnormal signal.

8-bit data output from the 26-bit latch 72 is input to the sub-parallel-to-serial converter 130. The frame number is also input to the same. The sub-parallel-to-serial converter 130 produces serial signals ad formatted as shown in FIGS. 7(a) to 7(d). For the serial signals, four frames denoted as (a) to (d) are combined to form one complete data.

Figure 9:
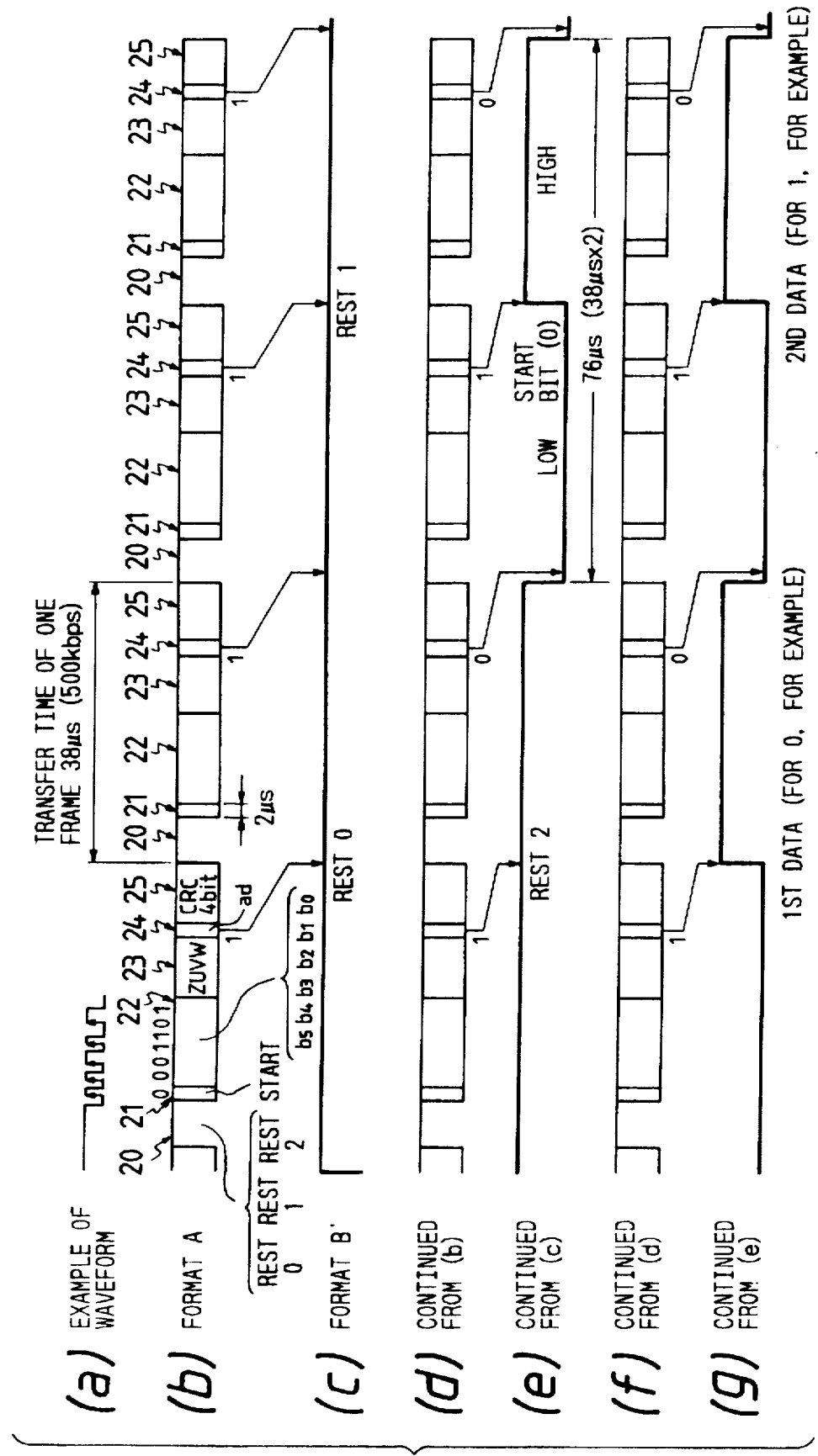
FIG. 9 is a timing chart useful in explaining the operation of a sub-serial-to-parallel converter and a main serial-to-parallel converter.

The Manchester code is used for the code in this embodiment. In the Manchester code, as shown in FIG. 9(a), when the bit is 0, the pulse rises at the mid point of the bit, and when the bit is 1, the pulse falls (This format will be called a format B which will be described in detail later.).

The absolute serial signal, the 6-bit up/down counter value, and the position data signals U, V, W, and Z are input to the main parallel-to-serial converter 6. The main parallel-to-serial converter 6 produces a serial signal formatted as shown in FIG. 4(a) (This format will be called a format A.).

In the format A, the transfer rate is 500 kbps as referred to above, and transfer time per frame is 38 µs.

In the figure, reference numeral 20 designates rest spaces of 3 bits; 21, a 1-bit start bit of 0; 22, 6-bit up/down counter value bit signals (which follow the start bit 21) transferred from the up/down counter 5; 23, 1-bit position data signals of U, V, W, and Z (which follow the up/down counter value 22) transferred from the first wave-shaping circuit 4c; 24, a 1-bit signal ad (which follows the position data signals 23 of U, N, W, and Z) of the absolute serial signals containing an absolute counter value of 24 bits and an abnormal signal of 2 bits, which are transferred from the sub-parallel-to-serial converter 130; and 25, a CRC bit signal of 4 bits for checking a series of data. The CRC bit 25 is added to the data signal by a signal from the first CRC bit adder 51. Thus, the rest spaces 20, the start bit 21, the up/down counter value bit signals 22, the position data signal 23, the 1-bit ad 24 of the absolute serial signals, and the CRC bit 25, totally 19 bits, make up one frame. Accordingly, the transfer time per bit is: 38 µs÷19 bits=2 µs. The Manchester code is used as in the case of the sub-parallel-to-serial converter 130. In the Manchester code, when the bit is 0, the pulse rises at the mid point of the bit, and when the bit is 1, the pulse falls.

The serial signals of one frame are transferred to the control unit 16, through the line driver 8 and the encoder cable 9, while updating transfer data in accordance with detect signals from the Hall elements 4a and the MR sensor 4b. These signals have been sampled at fixed time periods in accordance with a sampling signal and a clear signal from the main communication controller 50.

The serial signals are received by the line receiver 14 of the control unit 16, through the encoder cable 9. The serial signals are converted into parallel signals by the main serial-to-parallel converter 15. At the instant that the CRC bit 25 is checked, viz., at time points shown in FIG. 5(g), data is generated.

The parallel position data U', V', W', and Z', which result from the position data U, V, W, and Z, are straightforwardly transferred to the subsequent process stage. The absolute value circuit 45 determines whether the received signal is positive or negative on the basis of the count value $b_5$. When $b_5=0$, it determines that the received signal is positive. When $b_5=1$, it determined that the received signal is negative. When $b_5=1$, the absolute value circuit performs the calculation of 100000 (2)−$b_4$ $b_3$ $b_2$ $b_1$ $b_0$ (2), and outputs the result of the calculation. The output is 5 bits which are coded into $b_4'$ $b_3'$ $b_2'$ $b_1'$ $b_0'$.

The parenthesized numeral indicates a number system, that is, (2) indicates a binary number.

The 1/12 demultiplier 43A will be described.

The calculation of the necessary number of bits of the above-mentioned counter shows that the capability of generating a maximum number of b 26pulses during 38 µs suffices for the pulse generator 46 of the subsequent stage.

However, in this embodiment a clock signal to generate 31 number of pulses for 38 µs is required to lessen jitter of the A and B phases (The details of this will be described later). The frequency of the required clock signal is 31 pulses÷38 µs=815.8 kHz.

This can be obtained by demultiplying a fundamental clock signal of 10 MHz by 12.3

10 MHz÷815.8 kHz=12.3.

It is for this reason that the $1/12$ demultiplier 43A is used.

Figure 5:
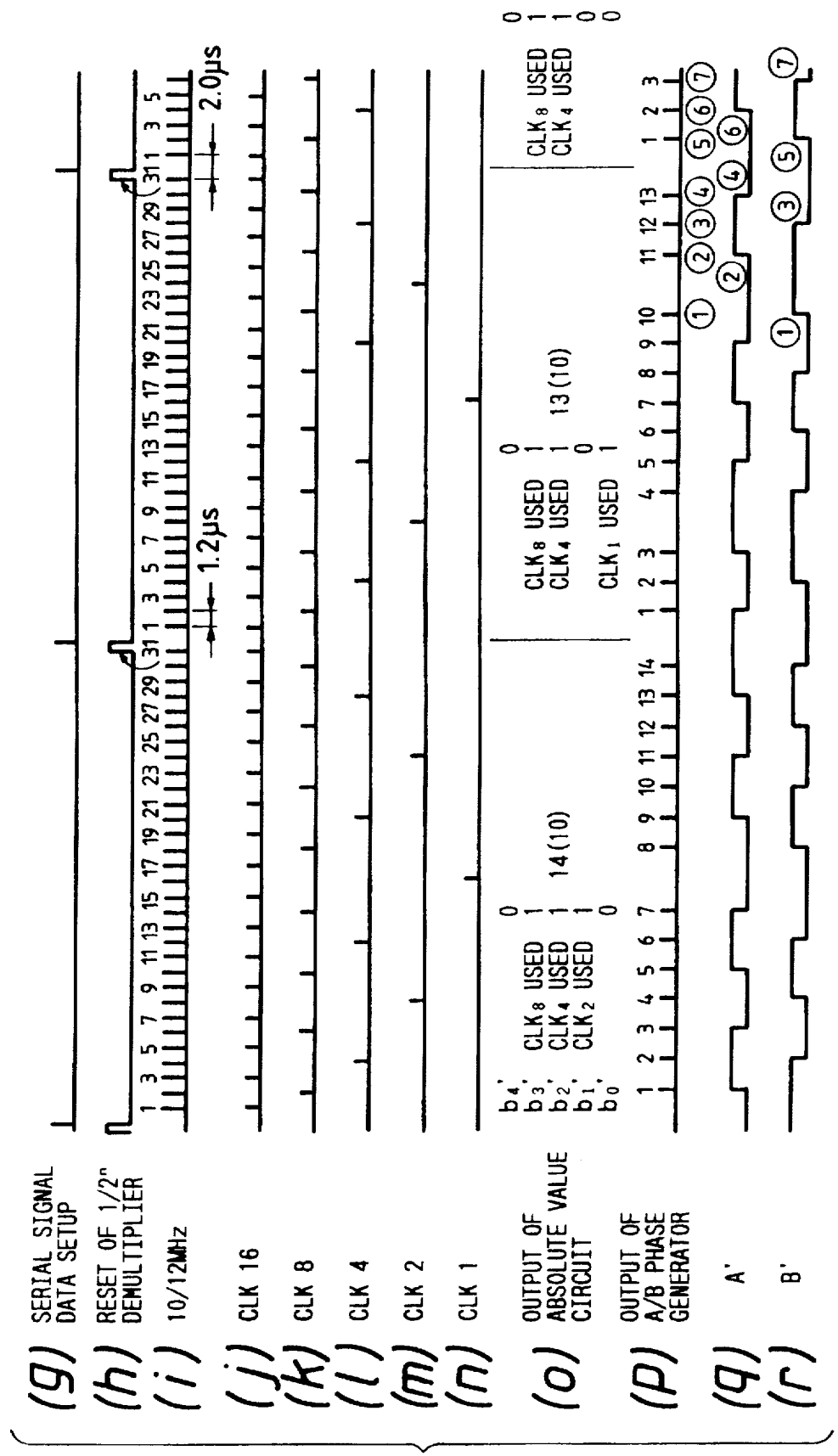
FIG. 5 is a timing chart useful in explaining the operation of the control unit of FIG. 3.

The output signal of the $1/12$ demultiplier 43A, viz., 31 pulses of the $10/12$ MHz clock signal, is not exactly coincident with 38 µs. To cope with this, a reset signal corresponding to the serial signal of one frame is applied from the main serial-to-parallel converter 15 to the $1/12$ demultiplier. The reset signal is shown in FIG. 5(h). After the 31st pulse of the $10/12$ MHz clock signal is generated, the $1/12$ demultiplier 43A is reset to be stopped in operation. At the timing of the data setup shown in FIG. 5(g), the reset of the $1/12$ demultiplier 43A is removed. One pulse is are generated every 1.2 µs. The interval between the 31st pulse and the 1st pulse is 2.0 µs.

The demultiplied signal of 31 pulses is input to the $1/2^n$ demultiplier 44A where these pulse signals are patterned into five pulse trains of different pulse densities. For the $1/2^n$ demultiplier 44A and the pulse generator 46 to be given later, reference is made to description on pp. 154 to 157 in "DIGITAL CIRCUIT—FUNDAMENTAL AND APPLICATION" written by Hiroshi Kawaharada, issued Oct. 15, 1982, published by Shokodo corporation). On the basis of the pulse distribution principle of the MIT system, the $10/12$ MHz clock signal is distributed into clock signals shown in FIGS. 5(j) to 5(n). CLK16 contains even numbered pulses; CLK8, pulses as the result of dividing $10/12$ MHz by 4, which contains the remainder 2; CLK4, pulses as the result of dividing it by 8, which contains the remainder 4; CLK2, pulses as the result of dividing it by 16, which contains the remainder 8; and CLK1, pulses as the result of dividing it by 32, which contains the remainder 16.

These pulse signals CLK16, CLK18, CLK4, CLK2, and CLK1, and the output signals $b_4'$ $b_3'$ $b_2'$ $b_1'$ $b_0'$ from the absolute value circuit 45 are input to the pulse generator 46.

Figure 10:
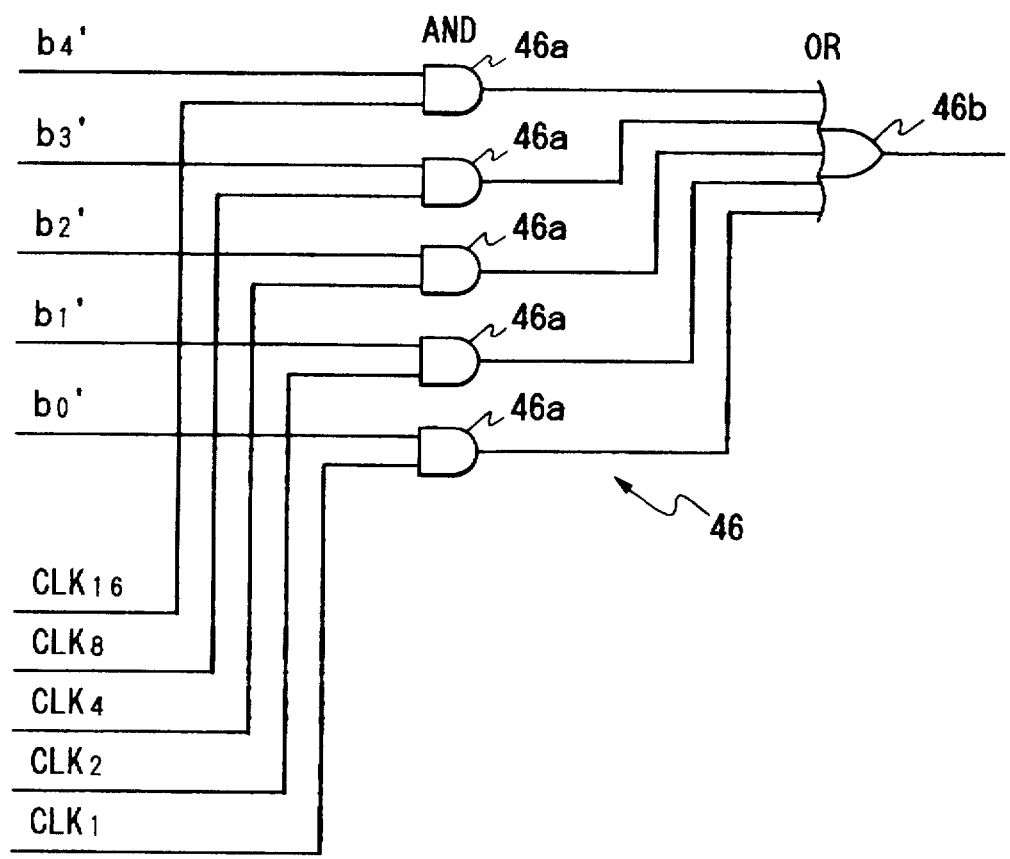
FIG. 10 is a circuit diagram showing a pulse generator.

The pulse generator 46, as shown in FIG. 10, is made up of AND circuits 46a and an OR circuit 46b. The generator selects a combination of the pulse signals CLK16, CLK18, CLK4, CLK2, and CLK1 in accordance with the output signals $b_4'$, $b_3'$, $b_2'$, $b_1'$, $b_0'$, and produces a logic sum. When $b_4'$ $b_3'$ $b_2'$ $b_1'$ $b_0'$ are 01101 (2), located in the middle in FIG. 5(o), a combination of CLK8, CLK4, and CLK1 are selected, that is, the 2, 4, 6, 10, 12, 14, 16, 18, 20, 22, 26, 28, and 30th pulses of the $10/12$ MHz clock signal are selected, and added together, and a pulse signal shown in FIG. 5(p) is produced. As seen from FIG. 5(p), these pulses are almost uniformly distributed, with less jitter. The output signals A' and B' of the A/B phase generator 47 to be described later suffer from less jitter.

The pulse train shown in FIG. 5(p) is input to the A/B phase generator 47. Receiving the pulse train, the A/B phase generator 47 reproduces the incremental signals A' and B'. The A/B phase generator 47 is designed so as to switch its input, which receives the output signal from the pulse generator 46, between the up input and the down input in accordance with the 6-bit count value $b_5$. When $b_5$=0, the up input is selected, and when $b_5$=1, the down input is selected. For the rectangular waveforms of the A and B phases, the circuit is designed such that when one pulse is added to the output signal of the pulse generator 46, the phase of the B phase advances. Specifically, when the up input is selected, the B phase advances in phase, and when the down input is selected, the A phase advances. The output signals of the A/B phase generator 47 are shown in FIGS. 5(q) and 5(r). As seen, the B phase advances.

The edge signs (1), (2), . . . in FIGS. 4(b) and 4(c) correspond to those in FIGS. 5(q) and 5(r), respectively. As seen, time lags are observed. The time lags are due to serial transfer delay and wait for data setup. The time difference is 64 µs. No problem arises from this figure, for the transfer delay of the A and B phases. If the transfer rate is increased from 500 kbps to 1 Mbps, that transfer delay can be further reduced.

The first error counter 48 can detect an error using the incoming CRC bit 25. When detecting an error, the first error counter 48 produces a one-time error alarm, and transfers a hold signal to the absolute value circuit 45 and the latch circuit 49, and uses the data $b_5-b_0$ U, V, W, and Z, and ad of the block precedingly received. Since the reuse of the data $b_5-b_0$ is equivalent to a uniform rotation, it does not create any problem for the rotation of the motor. The reuse of the data U, V, W, and Z also does not create any problem since the frequency is low. For the data ad, the second error detector 87 detects its error using the CRC bits or on the basis of the fact that the code of the data is not the Manchester code. When an error successively occurs three times, the 3-successive detect circuit 83 produces a three-successive error alarm.

The present embodiment is designed such that when a one-time error alarm is produced, the motor is stopped to given a user a message of error occurrence. The system may be designed such that it is insensitive to the one-time error alarm, but responds to a three-successive error alarm, and stops the motor to give a user the error occurrence. In this case, there are eliminated the frequent stop or erroneous operation of the motor, which are caused by noise, since the data $b_5-b_0$ of the block precedingly received is used.

When a three-successive error occurs, the system determines that it is a true error, for example, the channel quality level is reduced, and causes the related circuit to generate a three-successive error alarm.

In FIG. 3, the prime sign ' is attached to the symbols of the reproduced signals, such as A', B', U', V', W', and Z', and ad'. The reason for this is that the reproduced signals have transfer delays with respect to the signals A, B, U, V, W, and Z, and ad. The absolute signal, as described above, is converted into serial signals, formatted into the format A and transferred, and is reproduced. In the present embodiment, with an intention to fabricate each of the pairs of the following circuit blocks into a single circuit, the same format is used for the format A, the format B, and a format (referred to as a format B') from the main serial-to-parallel converter 15. These pairs of the circuit blocks are: in the transmitter, the main parallel-to-serial converter 6 and the sub-parallel-to-serial converter 130, the first CRC bit adder 51 and the second CRC bit adder 52, the main communication controller 50 and the sub-communication controller 74, and in the receiver, the main serial-to-parallel converter 15 and the sub-serial-to-parallel converter 131, and the first error counter 48 and the second error detector 87.

The format B shown in FIGS. 7(a) to 7(d) will be described.

In the format B, the four frames (a) to (d) form one completer data. The reason for this is that since the data part (containing the up/down counter value bit signals 22, the position data signal 23 of U, V, W, and Z, and the 1-bit ad 24 of the absolute signals) of the format A consists of only 11 bits, it is impossible to transfer the absolute data of 24 bits and an abnormal signal of 2 bits in a state that all the data are packed into one frame.

The 0th frame shown in FIG. 7(a) will be described. Reference numeral 92 designates rest spaces of 3 bits before data transmission. The rest spaces 92 are in a high level. Numeral 93 indicates a 1-bit start bit of 0, which follows the rest spaces 92 and indicates that the data transmission starts; 94, a 1-bit empty space following the start bit 93; 95, frame number bits of 2 bits (follows the empty space 94) which is derived from the frame number generator 73 and indicates a place of the present frame; 96, empty spaces of 6 bits following the frame number bits 95; 97, an abnormal temperature bit of 1 bit (follows the empty spaces 96) derived from the abnormal temperature sensor 71; 98, an all-power-voltage abnormal bit of 1 bit (follows the abnormal temperature bit 97) derived from the all-power-voltage drop detector 70; and 99, CRC bits of 4 bits (follows the all-power-voltage abnormal bit 98) for checking a train of data (for error check). The CRC bits 99 is added to the data signal by a signal from the second CRC bit adder 52.

One frame consists of 19 bits. Since the format B uses the Manchester code, it is necessary to form one signal using two levels. Accordingly, the transfer time per bit is 38 μs (transfer time of the format A)×2=76 μs.

The transfer rate is 500 kbps (transfer rate of the format A)+[19 (number of bits of one frame of the format A)×2]=500/38 kbps.

The transfer time of one frame is

76 μs×19 bits=1.444 ms.

In the case where the Manchester code is not used, the term "×2" is removed from the above equations. Accordingly, the transfer rate of the format B, for example, is 500/19 kbps as a matter of course.

Thus, the format B is the same as the format A. That is, the rest spaces 92 consists of 3 bits, and are in high level. The start bit 93 consists of 1 bit and is 0. The number of data bits 94 to 98 is 11 bits. The number of the CRC bits 99 is 4 bits. The rules (generation polynomial) for forming the CRC bits 99 and the rules for the Manchester code (for example, when the bit is 0, the pulse rises at the mid point of the bit, and when the bit is 1, the pulse falls.) are the same as those of the format B.

Figure 7:
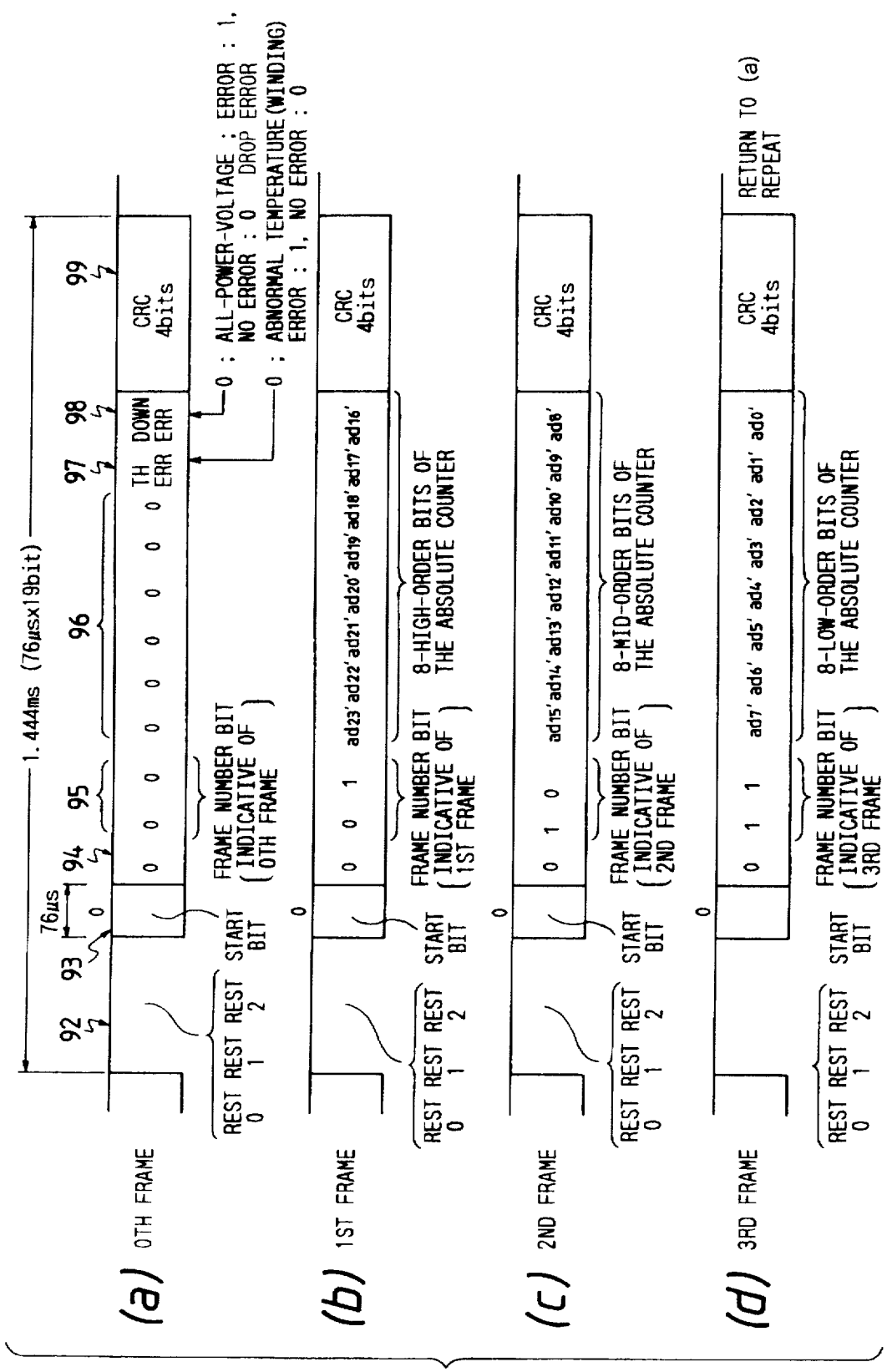
FIG. 7 is a diagram for explaining formats B and B'.
Figure 8:
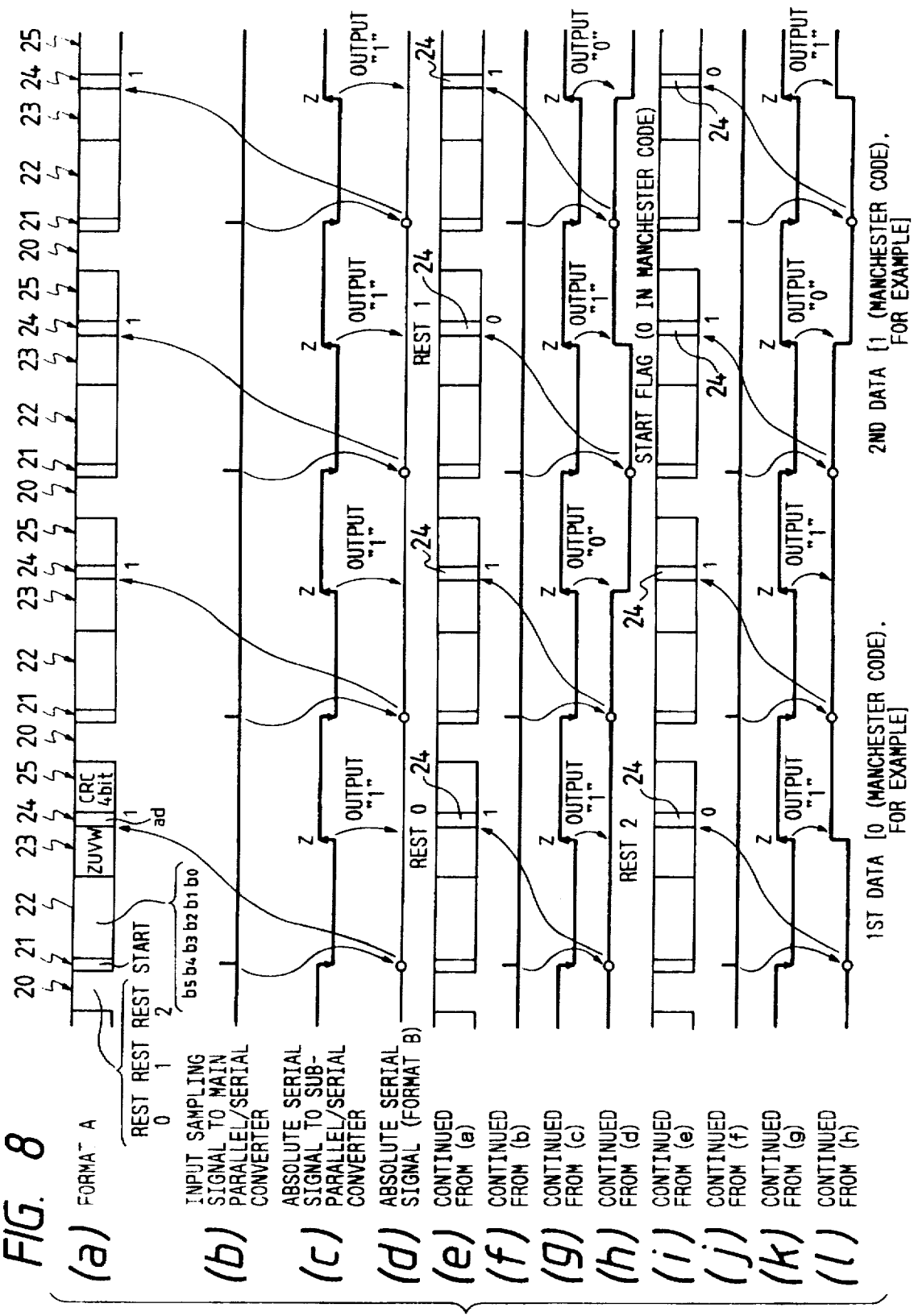
FIG. 8 is a timing chart useful in explaining the operation of a sub-parallel-to-serial converter and a main parallel-to-serial converter.

In the first frame output following the 0th frame, as shown in FIG. 7(b), 8 bits including the empty spaces 96, the abnormal temperature bit 97, and the all-power-voltage abnormal bit 98 are substituted by the 8-high-order bits $ad_{23}'$ to $ad_{16}'$ of the absolute counter. In the second frame output following the first frame, as shown in FIG. 7(c), those bits are substituted by the 8-mid-order bits $ad_{15}'$ to $ad_8'$ of the absolute counter. In the third frame output following the second frame, as shown in FIG. 7(d), those bits are substituted by the 8-low-order bits $ad_7'$ to $ad_0'$ of the absolute counter. The 0th to third frames shown in FIGS. 7(a) to 7(c) are sent out repeatedly.

Thus, the first to third frames have the same as the format A as the 0th frame does. These four frames form one complete data.

In the first to third frames, the contents of the frame number bits 95 are changed as shown in order to indicate the different frame numbers.

The timings of sending out the absolute serial signals formatted into the format B will be described.

For the absolute serial signal, the data to next be sent out is set up at the timings (denoted as Z) of an absolute serial signal input clock signal (1/19 of 500 kHz of the fundamental clock signal) shown in FIGS. 8(c), 8(g) and 8(k). The main parallel-to-serial converter 6 has received an input sampling signal shown in FIGS. 8(b), 8(f), and 8(j) from the main communication controller 50, and fetches the absolute serial signal shown in FIGS. 8(d), 8(h), and 8(l), which is set up at the timings of the input sampling signal, and sets the absolute serial signal in the part of the ad serial bit, and sends it to the receiver.

After receiving the CRC bit 25 shown in FIGS. 9(b), 9(d), and 9(f), if no error is present, the main serial-to-parallel converter 15 sets up the receiving data, changes the data at the time of the $rest_0$ of the format A, and sends out an absolute serial signal as shown in FIG. 9(c), 9(e), and 9(g) to the sub-serial-to-parallel converter 131. In the format B' of the absolute serial signal, two levels are required for reproducing the Manchester code from the ad serial bit. Accordingly, as in the sub-parallel-to-serial converter 130, the transfer time per bit is 38 μs (transfer time of the format A)×2=76 μs, and the transfer rate is 500 kbps (the transfer rate of the format A)+[19 (the number of bits of one frame of the format A)×2]=500/38 kbps. Where the Manchester code is not used, it is a matter of course that the transfer rate of the format B' is 500/19 kbps.

The format B' of the data signal output from the main serial-to-parallel converter 15, as described above, is the same as the format B shown in FIG. 7. A part of the format B' is shown in FIGS. 9(c), 9(e), and 9(g). As a matter of course, this is the same as in the transmitter. six 1's are successively output every 38 is from the start, in the form of 1, 1, 1, 1, 1, 1. These are reproduced as three rests, with 76 μs as 1 bit (1, 1 form one rest). The subsequent 0, 1 indicate 0 (rise) of the start bit, and the next 0, 1, 0, 1 indicate that the data is continued as 0, 0.

The subsequent 9-bit data and the CRC bit are omitted for simplicity.

Thus, the superposed absolute serial signal is expressed by the Manchester code where the transfer rate is 500/38 kbps, while in the format A, the transfer rate is 500 kbps and the transfer time per frame is 38 μs.

To handle the transfer rate 500/38 kbps, the present embodiment uses the 1/38 demultiplier 84 for demultiplying 10 MHz of the fundamental clock signal into 1/38. The output signal of the 1/38 demultiplier 84 is input to the sub-serial-to-parallel converter 131. For the absolute data, a four number of format data B' form one complete data. The time required is 19 bits×76 μs×4 (times)=5.776 ms.

The absolute counter value is used for checking the present position, not for the feedback control. Accordingly, no problem arises from this time.

The output signal from the sub-serial-to-parallel converter 131 is input to the demultiplexer 86, and latched in the 0th to 3rd frame latches 88 to 91 in accordance with a frame number output from the frame number discriminator 85. The 0th frame latch 88 produces information as to whether or not all-power-voltage drop and the motor temperature abnormally rises. The 1st frame latch 89 produces the 8-high-order bits ($ad_{23}'$ to $ad_{16}'$) of the absolute counter. The 2nd frame latch 90 produces the 8-mid-order bits ($ad_{15}'$ to $ad_8'$) of the absolute counter. The 3rd frame latch 91 produces the 8-low-order bits ($ad_7'$ to $ad_0'$) of the absolute counter.

The second error detector 87 is designed so as to detect an error from an incoming CRC bits 99 (see FIG. 7). When detecting an error, the detector produces a one-time error alarm to show a user an error occurrence.

As described above, the present embodiment employs the same format for the format A (the format from the main parallel-to-serial converter 6), the format B (the format from the sub-parallel-to-serial converter 130), and the format B' (format from the main serial-to-parallel converter 15). Each of the pairs of the following circuit blocks may be fabricated into a single circuit: in the transmitter, the main parallel-to-serial converter 6 and the sub-parallel-to-serial converter 130, the first CRC bit adder 51 and the second CRC bit adder 52, the main communication controller 50 and the subcommunication controller 74, and in the receiver, the main serial-to-parallel converter 15 and the sub-serial-to-parallel converter 131, and the first error counter 48 and the second error detector 87. Therefore, cost reduction of design, parts, management, and the like is realized.

The transfer rate of the format B and the format B' is ⅟₃₈ as high as the transfer rate of the format A. Therefore, the frequency of the clock signal input to the sub-parallel-to-serial converter 130 and the sub-serial-to-parallel converter 131 must be reduced to ⅟₃₈.

Figure 11:
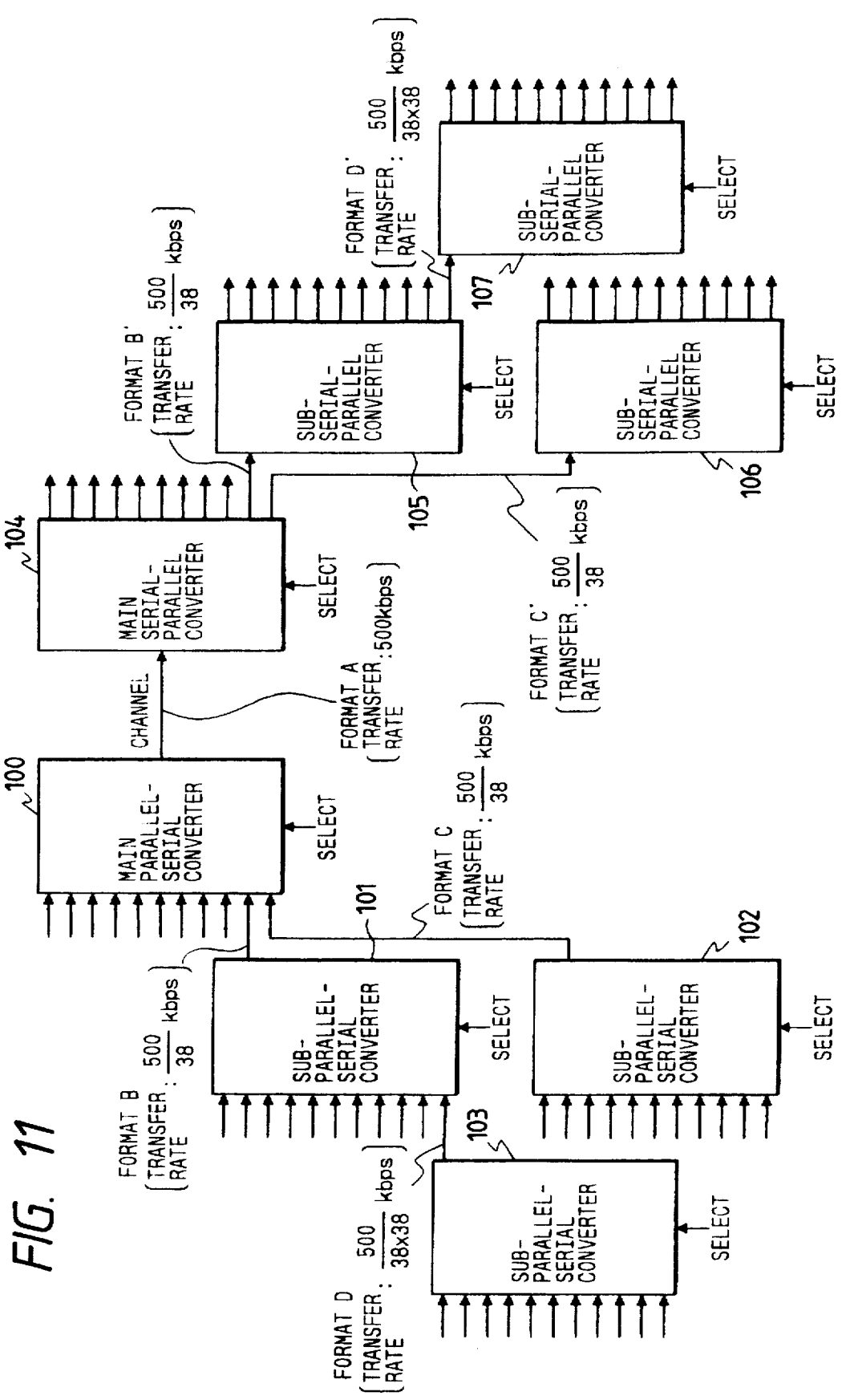
FIG. 11 is a block diagram showing a key portion of a signal transmission system incorporating a method of transmitting multiple serial signals, which is a second embodiment of the present invention.

FIG. 11 is a block diagram showing a key portion of a signal transmission system incorporating a method of transmitting multiple serial signals according to a second embodiment of the present invention.

The arrangement of the second embodiment of the invention will be described. In the transmitter, the output terminals of sub-parallel-serial converters 101 and 102 are connected to the input terminal of the main parallel-serial converter 100. A sub-parallel-serial converter 103 is connected to the input terminal of the sub-parallel-serial converter 101. In the receiver, the input terminals of sub-serial-parallel converters 105 and 106 are input to the output terminal of the main serial-parallel converter 104. The input terminal of a sub-serial-parallel converter 107 is connected to the output terminal of the sub-serial-parallel converter 105.

Those converters are constructed with common ICs such that all of the parallel-serial converters 100 to 103 have an eleven number of input terminals, and one output terminal, and all of the serial-parallel converters 104 to 107 have one input terminal and an eleven number of output terminals. Those converters 100 to 107 are provided with select terminals. With the use of the select terminals, the transmission transfer rate is selected in the parallel-serial converters 100 to 103, and the receive transfer rate is selected in the serial-parallel converters 104 to 107.

In the second embodiment, a format D is used for data transfer between the sub-parallel-serial converters 101 and 103; a format C, for the data transfer between the sub-parallel-serial converter 102 and the main parallel-serial converter 100; a format B, for the data transmission between the sub-parallel-serial converter 101 and the main parallel-serial converter 100; a format A, for the data transmission between the main parallel-serial converter 100 and the main serial-parallel converter 104; a format B', for the data transmission between the main serial-parallel converter 104 and the sub-serial-parallel converter 105; a format C', for the data transmission between the main serial-parallel converter 104 and the sub-serial-parallel converter 106; and a format D', for the data transmission between the sub-serial-parallel converter 105 and the sub-serial-parallel converter 107. All of the formats A, B, B', C, C', D, D' are designed to have the same constructions, as in the first embodiment as follows: the number of bits of the rest spaces is 3 bits and in high level; the number of a start bit is 1 bit and "0"; the number of bits for the data bit part is 11 bits; and the number of bits for the CRC bit part is 4 bits; the rules (generation polynomial) for generating the CRC bits and the rules for the Manchester code (for example, when the bit is 0, the pulse rises at the mid point of the bit, and when the bit is 1, the pulse falls.) are the same as those of the format B.

The transfer rate of each of those formats, as shown in FIG. 11, is multiplied by ⅟₃₈ (the number of bits of one frame ×2) every time it passes through the converter. To change the transfer rate, the converters are provided with the select terminals.

The thus arranged signal transmission system of the second embodiment can attain the useful effects as the signal transmission system of the first embodiment, as a matter of course. The parallel-serial converters 100 to 103 and the serial-parallel converters 104 to 107 are constructed with the separate ICs having the transfer rates select functions, respectively. Accordingly, those converters may be mounted separately. This is very useful in reducing the cost to manufacture the system. For example, for a user who does not use the subconverters, that is, does not need the absolute data in the receiver in FIG. 3, the signal transmission system supplied to him is designed omitting the subconverters.

When one type of the parallel-serial converter IC with the select terminal and one type of the serial-parallel converter IC are designed, a designer can construct a various types of signal transmission systems by properly combining those converter ICs.

The subconverters may be connected in a series or cascade fashion.

A third embodiment of the present invention will be described with reference to FIGS. 12 and 13.

FIG. 12 is a diagram showing the relationship between a format Ao of the data that is transmitted from the main parallel-to-serial converter 6 to the main serial-to-parallel converter 15, which are used in the first embodiment, and a format Bo' (a format Bo of the data transferred from the sub-parallel-to-serial converter 130 to the main parallel-to-serial converter 6 is the same as the format Bo') of the data that is transmitted from the main serial-to-parallel converter 15 to the sub-serial-to-parallel converter 131. FIG. 13 is a diagram showing the data formats of FIG. 12 of which the time axis is reduced.

In the third embodiment, the format Ao is different from the formats Bo and Bo'. The formats Bo and Bo' are the same formats of the start-stop synchronization type.

One frame of the format Ao, as shown in FIG. 12, includes a rest space 110 of 9 bits, a start bit 111 of 8 bits, which follows the rest space 110, an up/down count value 112 of 6 bits (which follows the start bit 111) transferred from the up/down counter 5, position data signals 113 of U, V, W, and Z (which follows the up/down count value 112) transferred from the first wave-shaping circuit 4c, a 1-bit ad 114 (which follows the position data signals 113) of the absolute serial signals containing an absolute counter value and an abnormal signal, which are transferred from the sub-parallel-to-serial converter 130, and a CRC bits part (which follows the 1-bit ad 114 of the absolution serial signal) of 4 bits for checking a series of data. The transfer time per frame (32 bits) is approximately 52.08 μs (exactly ⅟₁₉₂₀₀ Hz). The transfer time per bit is approximately 1.6275 μs (1/[19200 Hz×32 bits]).

One frame of the format Bo (Bo') of the start-stop synchronization type, as shown in FIG. 13(b), includes a rest space 120 of 3 bits, a 1-bit start bit part 121, fixed at low level (0), which follows the rest space 120, a data bit part 122 of 7 bits, which follows the 1-bit start bit part 121, a parity bit part 123 of one bit, which follows the data bit part 122, and a stop bit part 124, fixed at high level (1), which follows the parity bit part 123 (see the 0th character). One frame of this format consists of 13 bits, and the transfer rate of one frame is 677 μs. The bit parts of the format uses levels for expressing information, not using the Manchester code.

The ASCII code is sued for the data bit part. A total of eight ASCII codes are used for expressing one absolute counter value and an abnormal signal of two bits. Accordingly, 0th character to 7th character are used for distinctively indicating those items of data. The contents of these characters are as shown in Table 1.

TABLE 1

| Character No. | Contents | Remarks |
| --- | --- | --- |
| 0th character | "S" | Start |
| 1st character | "0"–"3" | Error information of 2 bits |
| 2nd character | "0" to "F" | $ad_{23}'$ to $ad_{20}'$ of the absolute counter |
| 3rd character | Same as above | $ad_{19}'$ to $ad_{16}'$ of the absolute counter |
| 4th character | Same as above | $ad_{15}'$ to $ad_{12}'$ of the absolute counter |
| 5th character | Same as above | $ad_{11}'$ to $ad_{8}'$ of the absolute counter |
| 6th character | Same as above | $ad_{7}'$ to $ad_{4}'$ of the absolute counter |
| 7th character | Same as above | $ad_{3}'$ to $ad_{0}'$ of the absolute counter |

As shown in Table 1, the 0th character indicates start; the 1st character, error information of 2 bits corresponding to the 0th frame; the 2nd character indicates $ad_{23}'$ to $ad_{20}'$ of the absolute counter; the 3rd character indicates $ad_{19'\ to\ ad16}'$ of the absolute counter; the 4th character, $ad_{15}'$ to $ad_{12}'$ of the absolute counter; the 5th character indicates $ad_{11}'$ to $ad_{8}'$ of the absolute counter; and 6th character, $ad_{7}'$ to $ad_{4}'$ of the absolute counter; and 7th character, $ad_{3}'$ to $ad_{0}'$ of the absolute counter. The transfer time and the reproducing time of one absolute counter are each approximately 5.4 ms (8 characters×13 bits/19200 Hz).

In the present embodiment, absolute serial signals are transferred from the sub-parallel-to-serial converter 130 to the main parallel-to-serial converter 6 using the format of the start-stop synchronization type shown in FIG. 13(b). The transfer rate of one frame of the format Ao is equal to that in RS232C protocol, widely used for the data transmission by personal computers. Accordingly, commercially available ICs operable at that transfer rate, such as ICs of UART or general microprocessor ICs with UART, may be used for the sub-serial-to-parallel converters 131.

In the present embodiment, the transfer rate of one frame of the format Ao is set at 19200 bps. The RS232C protocol prescribes other transfer rates, such as 300, 600, 1200, 4800, and 9600, namely, 300 bps×n (n: natural number). ICs of UART and general microprocessor ICs with UART, which are operable at those transfer rates, are also marketed. Accordingly, the transfer rate of one frame of the format $A_0$ may be changed to any of those transfer rates.

The marketed UART ICs allow to receive the signals, even if frequency error is more than about 25%. However, in the marketed UART ICs, when an error exceeds 10%, a receive error may be caused. Accordingly, it is desirable that the error is held within 10%.

In the third embodiment, the same format of the start-stop synchronization type is used for both the format Bo and Bo'. The transfer time of one frame of the format Ao is set at 1/[300×n(n: natural number)×(0.9~1.1)] sec. Accordingly, a UART IC or a microprocessor with UART, currently marketed, may be used for the sub-serial-to-parallel converter 131. Cost reduction of design, parts, management, and the like is realized.

In the above equation of the transfer time, "(0.9~1.1)" is used allowing for a tolerable error of ±10%.

The sub-parallel-to-serial converter 130 also receives a clock signal at 19200 Hz (300×n) from the main communication controller 50. Accordingly, a serial communication interface IC of the clock synchronization type, commercially available, may be used for the sub-parallel-to-serial converter 130. The cost reduction is realized as in the transmitter.

In the case of the third embodiment, a ⅟₁₆ demultiplier must be used in place of the ⅟₁₂ demultiplier 43A shown in FIG. 3.

While the present invention has been made using some specific embodiments, these embodiments may variously be changed, modified, and altered with the scope of the invention. In FIG. 11 of the second embodiment, the format A is changed to the format Ao shown in FIG. 13(a), and the formats C and C' are changed to the format of the start-stop synchronization type. These formats are mixed into the formats of the second embodiment.

In this case, the number of bits per frame of the format A is 32 bits, the transfer rate is 614.4 Kbps (=19200 Hz×32 bits). The transfer rate of the formats B and B' is 614.4 kbps/(32 bits×2 (times)) and their code is the Manchester code. The transfer rate of the formats C and C' is 19200 bps.

In the above-mentioned embodiments, the data of the absolute encoder is transmitted and reproduced using the subconverters. It is evident that the present invention is similarly applicable for a case where other data is transmitted and reproduced by the subconverters.

As seen from the foregoing description, in a method of transmitting multiple serial signals according to the invention, for data transmission, the plural number of parallel-to-serial converters and the plural number of serial-to-parallel converters are connected in series, and the format of the serial signals on the channel, the format for the parallel-to-serial converters located preceding to the channel, and the format for the serial-to-parallel converters located succeeding to the channel are the same formats. Therefore, the first invention succeeds in cost reduction in design, parts, management and the like.

In a method of transmitting multiple serial signals according to the invention, the parallel-to-serial converters and serial-to-parallel converters are constructed with ICs each with a transfer-rate select function. Therefore, the converters may be mounted separately. For example, for a user who does not use the subconverters, the signal transmission system supplied to him is designed omitting the subconverters. This brings about cost reduction.

In a method of transmitting multiple serial signals according to the invention, for data transmission, the plural number of parallel-to-serial converters and the plural number of serial-to-parallel converters are connected in series, the format of the serial signals on the channel, the format for the parallel-to-serial converters located preceding to the channel, and the format for the serial-to-parallel converters located succeeding to the channel are the same formats of the start-stop synchronization type. With this construction, commercially available ICs may be used for the subconverters. This also leads to cost reduction in design, parts, management and the like.

The foregoing description of preferred embodiments of the invention have been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modi-

What is claimed is:

1. A method of transmitting multiple serial signals comprising the steps of:

converting parallel signals into serial signals by a plural number of parallel-to-serial converters provided in a transmitter;

converting serial signals into parallel signals by a plural number of serial-to-parallel converters provided in a receiver and connected in series with each other; and transmitting multiple serial signals between the transmitter and the receiver through a transmission channel, wherein said plural number of parallel-to-serial converters are connected in series, a number of preceding parallel-to-serial converters is less than a number of input signal lines of succeeding-parallel-to-serial converters, and a format of the serial signals on the channel, a format of the signals provided by the parallel-to-serial converters located preceding to the channel, and a format of the signals received by the serial-to-parallel converters located succeeding to the channel are the same and each include a start bit representing a start of a frame, value bits, data bits, and check bits for checking errors in the signals.

2. The method of transmitting multiple serial signals according to claim 1, wherein said parallel-to-serial converters are constructed with ICs each with a transfer-rate select function, and these ICs are connected for data transmission.

3. The method of transmitting multiple serial signals according to claim 1, wherein said serial-to-parallel converters are constructed with ICs with a transfer-rate select function, and these ICs are connected for data reception.

4. A method as claimed in claim 1, further comprising a step of generating at least one of the parallel signals, which are converted into serial signals, based on at least one signal on which no other of said parallel signals are based.

5. A method as claimed in claim 4, wherein:

the generating step uses one of the parallel-to-serial converters to generate said at least one of the parallel signals; and the method further comprises a step of outputting the at least one of the parallel signals to another one of the parallel-to-serial converters.

6. A method as claimed in claim 1, wherein said parallel-to-serial converters includes a single succeeding parallel-to-serial converter and two preceding parallel converters which are parallelly connected to the succeeding parallel-to-serial converter.

7. A method as claimed in claim 1, wherein said parallel-to-serial converters are connected in series with each other in a multi-stage connection.

8. A method as claimed in claim 1, wherein said number of input signal lines of any said parallel-to-serial converter on which parallel signals are input to be converted into serial signals is greater than a number of total outputs of said parallel-to-serial converters preceding said any parallel-to-serial converter.

9. A method of transmitting multiple serial signals comprising the steps of:

converting parallel signals into serial signals by a plural number of parallel-to-serial converters provided in a transmitter;

converting serial signals into parallel signals by a plural number of serial-to-parallel converters provided in a receiver and connected in series with each other; and transmitting absolute position detection information of a movable body by multiple serial signals between the transmitter and the receiver through a transmission channel;

wherein said plural number of parallel-to-serial converters are connected in series, a number of preceding parallel-to-serial converters is less than a number of input signal lines of succeeding parallel-to-serial converters, the absolute position detection information is transmitted to the parallel-to-serial converter which is located immediately preceding the transmission channel as a serial input signal in a start-stop synchronization format, and the absolute position detection information in the start-stop synchronization format is received as an output signal of the serial-to-parallel converter which is located immediately succeeding the transmission channel.

10. The method of transmitting multiple serial signals according to claim 9, wherein the transfer time of the format of the serial signals for one frame on the channel is 1/[(300×n (n: natural number))×(0.9~1.1)] sec.

11. A method as claimed in claim 9, further comprising a step of generating at least one of the parallel signals, which are converted into serial signals, based on at least one signal on which no other of said parallel signals are based.

12. A method as claimed in claim 11, wherein:

the generating step uses one of the parallel-to-serial converters to generate said at least one of the parallel signals; and the method further comprises a step of outputting the at least one of the parallel signals to another one of the parallel-to-serial converters.

13. A method as claimed in claim 9, wherein said parallel-to-serial converters includes single succeeding parallel-to-serial converters which are parallelly connected to the succeeding parallel-to-serial converter.

14. The method as claimed in claim 9, wherein said parallel-to-serial converters are connected in series with each other in a multi-stage connection.

15. A method as claimed in claim 4, wherein said number of input signal lines of any said parallel-to-serial converter on which parallel signals are input to be converted into serial signals is greater than a number of total outputs of said parallel-to-serial converters preceding said any parallel-to-serial converter.

* * * * *